United States Patent
Blackmon et al.

(10) Patent No.: US 6,657,025 B2
(45) Date of Patent: Dec. 2, 2003

(54) PRODUCTION OF ULTRA HIGH MELT FLOW POLYPROPYLENE RESINS

(75) Inventors: Kenneth Paul Blackmon, Houston, TX (US); Luis Paulo Barthel-Rosa, Lafayette, IN (US); Shabbir Ahmedbhai Malbari, Pasadena, TX (US); David J. Rauscher, Angleton, TX (US); Michel M. Daumerie, Hoostow (BE)

(73) Assignee: Fina Technology, Inc., Houston, TX (US)

( * ) Notice: Subject to any disclaimer, the term of this patent is extended or adjusted under 35 U.S.C. 154(b) by 0 days.

(21) Appl. No.: 10/044,886

(22) Filed: Jan. 11, 2002

(65) Prior Publication Data
US 2002/0161139 A1 Oct. 31, 2002

Related U.S. Application Data

(60) Provisional application No. 60/261,705, filed on Jan. 12, 2001.
(51) Int. Cl.$^7$ ................................................. C08F 4/42
(52) U.S. Cl. ...................... 526/142; 526/351; 526/124.3; 526/158; 502/132; 502/134; 502/103; 502/126; 502/125
(58) Field of Search ................................ 526/142, 351, 526/124.3, 158; 502/132, 134, 103, 126, 125

(56) References Cited

U.S. PATENT DOCUMENTS

| | | | |
|---|---|---|---|
| 4,971,937 A | | 11/1990 | Albizzati et al. |
| 5,068,213 A | | 11/1991 | Albizzati et al. |
| 5,106,807 A | | 4/1992 | Morini et al. |
| 6,057,407 A | | 5/2000 | Lin et al. |
| 6,395,670 B1 | * | 5/2002 | Morini et al. ............... 502/140 |

FOREIGN PATENT DOCUMENTS

| EP | 0361493 | 11/1994 |
|---|---|---|
| EP | 0361494 | 2/1996 |

* cited by examiner

*Primary Examiner*—Ling-Siu Choi
(74) *Attorney, Agent, or Firm*—Grady K. Bergen; Bradley A. Misley

(57) ABSTRACT

A method of preparing ultra high melt flow polypropylene having reduced xylene solubles is provided. The method utilizes a diether internal donor-containing Ziegler-Natta catalyst system to polymerize propylene. The polypropylene produced is characterized by having a melt flow of at least about 300 g/10 min and a xylene solubles of not more than about 3.5% and no peroxide residue. The catalyst system may also include an internal phthalate donor. The method of the invention allows the amount of external donors to be reduced, or even eliminated, without significant increases in xylene solubles.

9 Claims, 5 Drawing Sheets

Fluff Particle Size Distributions from RK-100, RH-220 and Catalyst X with Various Donors (Al/Si = 50, $H_2$ = 0.27 mol %)

Plot of Hydrogen, Melt Flow, Donor Level, and Xylene Solubles During RK-100 Trial Plot of Hydrogen, Melt Flow, Donor Level, and Xylene Solubles
For Conventional Z-N Catalyst (Catalyst Y)

Relative Catalyst Productivity for PP Fluff From
RK-100 and Catalyst Y

PRODUCTION OF ULTRA HIGH MELT FLOW POLYPROPYLENE RESINS

This application claims the benefit of U.S. Provisional Application No. 60/261,705, filed Jan. 12, 2001.

BACKGROUND

Thermoplastic olefin polymers, such as linear polyethylene, polypropylene, and olefin copolymers, are formed in polymerization reactions in which a monomer is introduced into a reactor with an appropriate catalyst to produce the olefin homopolymer or copolymer. The polymer is withdrawn from the catalyst reactor and may be subjected to appropriate processing steps and then extruded as a thermoplastic mass through an extruder and die mechanism to produce the polymer as a raw material in particulate form, usually as pellets or granules. The polymer particles are ultimately heated and processed in the formation of the desired end products.

Melt flow is the measure of a polymer's ability to flow under certain conditions. It is typically measured as a melt flow index, which is the amount of polymer that flows over a period of time under specified conditions. Typical melt flow units of measurement are g/10 min. Melt flow provides an indication of the polymer resin's processability, such as in extrusion or molding, where it is necessary to soften or melt the polymer resin. Polymer resins produced with a low melt flow may need to be further modified after their initial polymerization to improve their processability. This is typically done through controlled rheology (CR) techniques wherein the molecular weight of the polymer is lowered, usually by the addition of peroxide, to thereby improve its flowability. This secondary processing, however, adds additional processing steps and increases the cost of manufacturing. Controlled rheology processing may also degrade the polymer and leave peroxide residue so that its use may be limited in certain applications. As defined herein, "peroxide residue" shall be construed to mean the decomposition and reaction products of peroxide, such as tert-butyl alcohol, as well as unreacted peroxide, typically found in CR-modified polymers.

Polypropylene is most often produced as a stereospecific polymer. Stereospecific polymers are polymers that have a defined arrangement of molecules in space. Both isotactic and syndiotactic propylene polymers, for example, are stereospecific. Isotactic polypropylene is characterized by having all the pendant methyl groups oriented either above or below the polymer chain. Isotactic polypropylene can be illustrated by the following chemical formula:

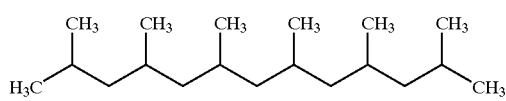

(1)

This structure provides a highly crystalline polymer molecule. Using the Fisher projection formula, the stereochemical sequence of isotactic polypropylene, as shown by Formula (2), is described as follows:

(2)

Another way of describing the structure is through the use of NMR. Bovey's NMR nomenclature for an isotactic pentad is . . . mmmm . . . with each "m" representing a "meso" dyad, or successive methyl groups on the same side of the plane of the polymer chain. As is known in the art, any deviation or inversion in the structure of the chain lowers the degree of isotacticity and crystallinity of the polymer.

Conventional Ziegler-Natta catalysts are stereospecific complexes formed from a transition metal halide and a metal alkyl or hydride and are used in the production of isotactic polyolefins. Ziegler-Natta catalyst for the polymerization of olefins are well known in the art. The Ziegler-Natta catalysts are derived from a halide of a transition metal, such as titanium, chromium or vanadium with a metal hydride and/or metal alkyl, typically an organoaluminum compound as a co-catalyst. The catalyst is usually comprised of a titanium halide supported on a magnesium compound. Ziegler-Natta catalysts, such as titanium tetrachloride ($TiCl_4$) supported on an active magnesium dihalide, such as magnesium dichloride or magnesium dibromide, as disclosed, for example, in U.S. Pat. Nos. 4,298,718 and 4,544,717, both to Mayr et al. are supported catalysts. Silica may also be used as a support. The supported catalyst may be employed in conjunction with a co-catalyst such as an alkylaluminum compound, for example, triethylaluminum (TEAL), trimethyl aluminum (TMA) and triisobutyl aluminum (TIBAL).

Ultra high melt flow (UHMF) polypropylene generally has a melt flow of greater than about 300 g/10 min. The production of UHMF polymers can be achieved during their initial polymerization, without the need for secondary processing. This usually involves the addition of hydrogen during the polymerization reaction. Increasing hydrogen concentrations in the polymerization reactor, however, can result in the production of excessive xylene solubles, which is oftentimes undesirable. Equipment or process limitations may also limit the amount of hydrogen that can be used during the polymerization reaction.

The preparation of ultra high melt flow products during polymerization is a challenge involving a delicate balance between the desired melt flow and xylene solubles. Xylene solubles is a measure of the crystallinity or tacticity of the polymer, or a deviation from the mmmm pentad levels found in isotactic polymers discussed previously. Because increasing hydrogen level generally results in the production of higher xylene solubles, external donors have been used to offset or reduce the amount of xylene solubles levels.

External donors act as stereoselective control agents to control the amount of atactic or non-stereoregular polymer produced during the reaction, thus reducing the amount of xylene solubles. Examples of external donors include the organosilicon compounds such as cyclohexylmethyl dimethoxysilane (CMDS), dicyclopentyl dimethoxysilane (CPDS) and diisopropyl dimethoxysilane (DIDS). External donors, however, tend to reduce catalyst activity and tend to reduce the melt flow of the resulting polymer.

To obtain polymers with the desired high melt flow and reduced xylene solubles, a precise balance between hydrogen concentration and external donors must be struck. Therefore, obtaining ultra high melt flow polymers with low xylene solubles through the use of external donors has been quite difficult, and oftentimes results in significant production of off-grade or unacceptable materials when precise parameters are not maintained.

SUMMARY

A method of preparing ultra high melt flow polypropylene having reduced xylene solubles is provided. The method requires polymerizing propylene monomer within a reaction zone in the presence of an ether internal donor-containing Ziegler-Natta catalyst system to yield a polypropylene product having a melt flow of at least about 300 g/10 min and a xylene solubles of not more than about 3.5%. The catalyst system may optionally include an external donor or an internal phthalate donor. The method may be carried out with a hydrogen concentration of from about 0.3 to about 1.1 mol %.

An ultra high melt flow polypropylene having reduced xylene solubles is produced by polymerizing propylene monomer within a reaction zone in the presence of a di- or polyether internal donor-containing Ziegler-Natta catalyst system to yield a polypropylene product containing no peroxide residue and having a melt flow of at least about 300 g/10 min and a xylene solubles of not more than about 3.5%. The catalyst system may also include an internal phthalate donor.

BRIEF DESCRIPTION OF THE DRAWINGS

For a more complete understanding of the present invention, and the advantages thereof, reference is now made to the following descriptions taken in conjunction with the accompanying figures, in which.

DETAILED DESCRIPTION

Figure 1:
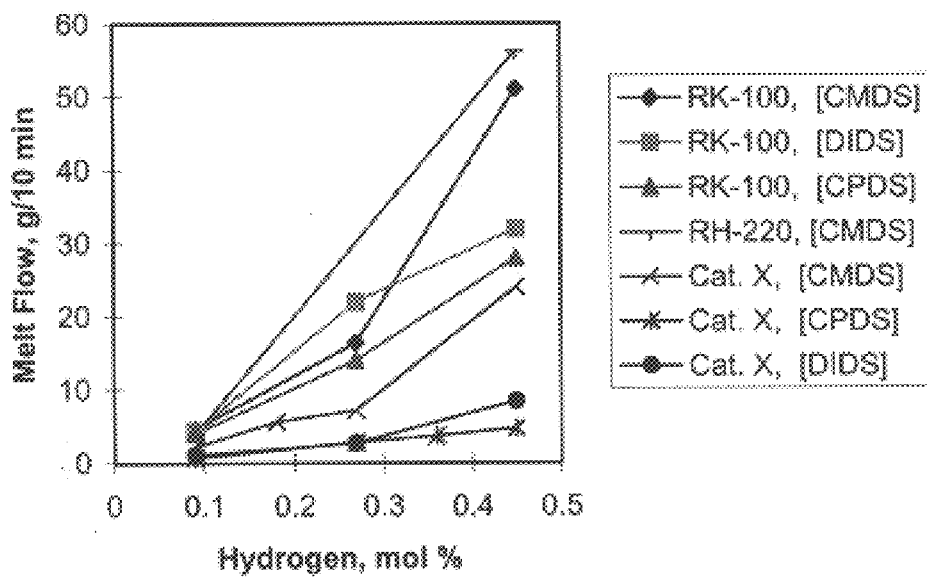
FIG. 1 is a plot of melt flow versus hydrogen concentration for given catalysts and different donors and a Al/Si ratio of 50.

It has been found that the use of a Ziegler-Natta catalyst that includes a diether or polyether-based internal electron donor for the polymerization of propylene can yield an ultra high melt flow polymer with low xylene solubles. This is advantageous because ultra high melt flow allows easier processability and may reduce or eliminate the need for further processing, such as through controlled rheology techniques. As used herein, ultra high melt flow generally refers to a melt flow of >300 g/10 min as measured according to ASTM D1238-95. The Ziegler-Natta catalysts are those derived from a halide of a transition metal, such as titanium, chromium or vanadium, with titanium being the desired metal. Examples of transition metal compounds include $TiCl_4$, $TiBr_4$, $TiO(C_2H_5)_3Cl$, $Ti(OC_2H_5)_3Cl$, $Ti(OC_3H_7)_2Cl_2$, $TiO(C_6H_{13})_2Cl_2$, $Ti(OC_2H_5)_2Br_2$ and $Ti(OC_{12}H_{25})Cl_3$. The transition metal compounds may be used individually or in combination. Typical titanium levels are from about 1.5% to about 4% by weight of catalyst.

The transition metal halide is used in combination with a metal hydride and/or metal alkyl, typically an organoaluminum compound as a co-catalyst. Desirably the co-catalyst is an aluminum alkyl having the formula $AlR_3$, where R is an alkyl having 1 to 8 carbon atoms, with R being the same or different. Examples of suitable aluminum alkyls are trimethyl aluminum (TMA), triethyl aluminum (TEAL) and triisobutyl aluminum (TIBAL). The desired aluminum alkyl is TEAL.

As discussed previously, the Ziegler-Natta catalyst includes at least one diether or polyether-based internal donor, which may be used alone or in combination. Optionally, the Ziegler-Natta catalyst may also include an internal phthalate donor. The diethers may be represented by the general formula:

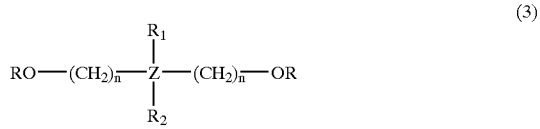

(3)

where R, $R_1$ and $R_2$ are linear or branched alkyl, cycloaliphatic, aryl, alkylaryl or arylalkyl radicals with 1–18 carbon atoms, and $R_1$ and $R_2$ may also be hydrogen, and where Z is carbon, silicon or germanium, desirably carbon or silicon. Examples of such suitable diether compounds include 2,2-diisobutyl-1,3-dimethoxypropane; 2-isopropyl 2-isopentyl-1,3-dimethoxypropane; 2,2-bis (cyclohexylmethyl)-1,3-dimethoxypropane, methyl-phenyl-dimethoxymethyl-silane; diphenyl-dimethoxymethylsilane; methyl-cyclohexyl-dimethoxy-methylsilane; di-tert-butyl-dimethoxymethyl-silane; cyclohexyl-tert-butyl-dimethoxy-methylsilane; and isopropyl-tert-butyl-dimethoxy-methylsilane. Other examples of suitable ethers are those listed in U.S. Pat. Nos. 4,971,937 and 5,106,807, which are incorporated herein by reference. As mentioned previously, other internal donors may be present, such as alkyl phthalate donors (e.g. diethyl phthalate, di-isobutyl phthalate). Examples of such donors are listed in U.S. Pat. No. 5,945,366, which is incorporated herein by reference.

These internal electron donors are added during the preparation of the catalysts and may be combined with the support or otherwise complexed with the transition metal halide. A suitable Ziegler-Natta catalyst containing a diether-based internal donor compound is that available as Mitsui RK-100 and Mitsui RH-220, both manufactured by Mitsui Chemicals, Inc., Japan. The RK-100 catalyst additionally includes an internal phthalate donor. The Ziegler-Natta catalyst is typically a supported catalyst. Suitable support materials include magnesium compounds, such as magnesium halides, dialkoxymagnesiums, alkoxymagnesium halides, magnesium oxyhalides, dialkylmagnesiums, magnesium oxide, magnesium hydroxide, and carboxylates of magnesium. Typical magnesium levels are from about 12% to about 20% by weight of catalyst. The RK-100 catalyst contains approximately 2.3% by weight titanium, with approximately 17.3% by weight magnesium, and an average particle size of about 13 microns. The RH-220 catalyst contains approximately 3.4% by weight titanium, with approximately 14.5% by weight magnesium, and an average particle size of about 16 microns.

The Ziegler-Natta catalyst may also be used with external donor compounds. External donors are typically organosilicon compounds. External electron donors may be those described by the formula $SiR_m(OR')_{4-m}$, where R is an alkyl group, a cycloalkyl group, an aryl group or a vinyl group, R' is an alkyl group, m is 0-4, R may be the same or different, and R' may be the same or different. The external electron donor acts as a stereoregulator to control the amount of atactic form of polymer produced, which results is in a decrease in xylene solubles. External donor compounds are known in the art for use as electron donors. Examples of electron donors that are organic silicon compounds are disclosed in U.S. Pat. Nos. 4,218,339; 4,395,360; 4,328,122; 4,473,660 and 4,927,797, which are incorporated herein by reference. Representative examples of external donors include cyclohexylmethyl dimethoxysilane (CMDS), dicyclopentyl dimethoxysilane (CPDS), diisopropyl dimethoxysilane (DIDS), cyclohexylisopropyl dimethoxysilane (CIDS), and di-t-butyl dimethoxysilane (DTDS).

It is noted, however, that although external donors may be used, their use can be decreased to provide ultra high melt flow polymers with low xylene solubles. Unless specified otherwise, amounts of external donor are presented herein as parts per million (ppm) based on the weight of monomer. It is desirable to reduce the amount of external donors from zero to about 10 ppm by weight of monomer. Desirably, the external donor is used in the range of from about zero to about 5 ppm, with from about zero to about 3 ppm being desired, from about zero to about 2 ppm being more desired, from about zero to about 1.5 ppm being even more desired, from about zero to about 1 ppm being still more desired, and from about zero to about 0.5 ppm being still more desired.

As is well known, polypropylene may be produced by slurry polymerization in the presence of a solvent, e.g. hexane, such as in a loop or CSTR reactor, or by bulk polymerization in which propylene serves as both monomer and diluent, which is typically carried out in a loop-type reactor. Also, polypropylene may be produced by gas phase polymerization of propylene, which is typically carried out in a fluidized bed reactor. In a typical bulk process, one or more loop reactors operating generally at 50 to 90° C. with pressures of about 400 to 600 psi may be used to effect the polymerization of propylene. The various catalytic components, i.e., Ziegler-Natta catalyst, cocatalyst, external donor (if any), are introduced into the reactor, as well as a molecular weight controlling agent (e.g., hydrogen), and the resulting polypropylene fluff or powder is continuously removed from the reactor. The fluff may then be subjected to extrusion to produce desired pellets.

Ziegler-Natta catalysts incorporating a diether internal donor compound were compared to Ziegler-Natta catalysts without such internal donors. The results showed that the diether-containing catalyst exhibited high activity, high hydrogen response, and yielded polymers with desirable stereoregularity (even in the absence of external donor). Specifically, Mitsui RK-100 was compared to other non-diether-containing Ziegler-Natta catalysts that have been used in the production of ultra high melt flow polymer materials, particularly polymers with a fluff melt flow around 350 g/10 min. Certain non-internal-diether-containing catalysts may exhibit a relatively high hydrogen response, however, formation of significant quantities of off-grade resin have been encountered with these catalysts due to the difficulty in obtaining the desired balance of polymer melt flow and xylene solubles level.

For bulk polymerization utilizing the diether internal donor-containing catalyst, the single loop reactor temperatures are usually kept from about 50 to about 100° C., more particularly from about 60° C. to about 70° C. It should be noted that increasing the temperature will typically result in an increased catalytic activity and lower xylene solubles. Hydrogen concentrations may vary, but are usually kept at from about 0.3 mol % to about 1.1 mol %, more particularly from about 0.5 mol % to about 0.8 mol % based on monomer, and depending on the resin melt flow desired. It is of particular note that the method of the invention has particular application where hydrogen concentrations may be limited, e.g., due to reactor pressure constraints or hydrogen solubility concerns. This is due to the relatively high hydrogen response of the diether-containing catalyst. Thus, very acceptable results can be achieved with hydrogen concentrations of from about 0.5 mol % to about 0.6 mol %, and even as a low as from about 0.4 mol % to about 0.5 mol %.

The ultra high melt flow polymers produced in accordance with the present invention are those having a melt flow after polymerization of at least 300 g/10 min or greater, as measured according to ASTM D1238-95. Typical melt flows are from about 300 g/10 min to about 1000 g/10 min, with from about 300 g/10 min to about 400 g/10 min being readily obtainable. Melt flows above 350 g/10 min, 400 g/10 min and even above 1000 g/10 min are attainable, while still retaining low xylene solubles. The polymers produced are also characterized as having low xylene solubles of not more than about 3.5%, with from about 1 to about 3.5% being readily obtainable, and from 2 to about 3.5% being more readily obtainable, without any significant reduction in melt flow. As used herein, the terms "propylene polymer" or "polypropylene," unless specified otherwise, shall mean propylene homopolymers or those polymers composed primarily of propylene and limited amounts of other comonomers, such as ethylene, wherein the comonomers make up less than 0.5% by weight of polymer, and more typically less than 0.1% by weight of polymer.

The following examples serve to illustrate the present invention.

EXAMPLES 1–5

In Examples 1–5, propylene polymerization studies were conducted utilizing Mitsui RK-100, Mitsui RH-220 and a conventional internal phthalate-containing Ziegler-Natta catalyst, designated herein as Catalyst X. This conventional Ziegler-Natta catalyst typically contains approximately 2.8% titanium by weight and approximately 19.2% magnesium by weight, with an average particle size in the range of 10 to 14 microns. The catalysts were tested in the presence of various external donors, which included CMDS, CPDS, and DIDS. Hydrogen levels were varied from 0.09 to 0.45 mol % at TEAL/donor molar ratios of 10 and 50. Table 1 gives the experimental conditions used for the polymerization reactions.

TABLE 1

Experimental Conditions for Catalyst Evaluations

| Reagents: | Conditions: |
|---|---|
| catalyst: 10 mg | temp.: 70° C. |
| TEAL: 1.0 mmol | time: 1 hour |
| Ext. Donor: 0.10 or 0.02 mmol | propylene: 1.4 L (0.72 kg) |
| Al/Donor: 10 or 50 | prepolymerization: in situ |
| hydrogen: 0.09 to 0.45 mol % | |

EXAMPLE 1

Catalyst Activity

The results showed that at lower hydrogen and higher external donor levels, the relative productivity of RK-100 was about 5–30% lower than that of the conventional Ziegler-Natta catalyst, while the relative productivity of RH-220 was about 1.5 times higher than that of the conventional Ziegler-Natta catalyst. However, at higher hydrogen levels (e.g. >0.45 mol %), the productivity of RK-100 was 1.1 to 1.9 times higher than that of Catalyst X. The RH-220 catalyst productivity was up to 2 times higher than that of Catalyst X under these higher hydrogen conditions. Thus, the activity benefits of the diether-containing catalysts at higher hydrogen levels, and particularly, at lower external donor levels, were readily apparent.

EXAMPLE 2

Melt Flow Performance

Figure 2:
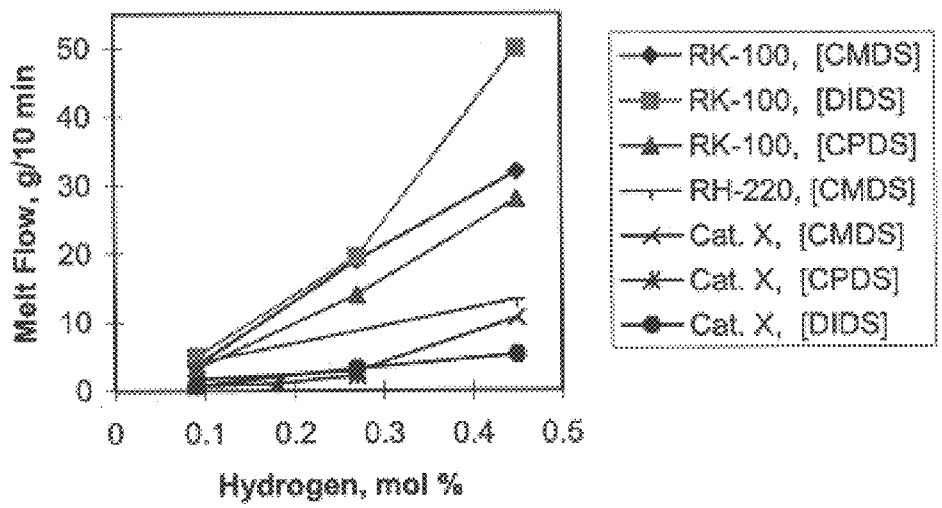
FIG. 2 is a plot of melt flow versus hydrogen concentration for given catalysts and different donors and a Al/Si ratio of 10.

The hydrogen responses of the RK-100, RH-220 and Catalyst X systems at low (Al/Si –50) and high (Al/Si –10) donor levels are compared in FIGS. 1 and 2, respectively, and tabulated in Tables 2 and 3, below.

TABLE 2

| Catalyst Sample (Al/Si - 50) | Hydrogen, mol % | Melt Flow, g/10 min |
|---|---|---|
| RK-100, [CMDS] | 0.09 | 4.6 |
| | 0.27 | 16.4 |
| | 0.45 | 51.0 |
| RK-100, [DIDS] | 0.09 | 4.4 |
| | 0.27 | 22.0 |
| | 0.45 | 32.0 |
| RK-100, [CPDS] | 0.09 | 4.0 |
| | 0.27 | 14.0 |
| | 0.45 | 28.0 |
| RH-220, [CMDS] | 0.09 | 3.9 |
| | 0.45 | 56.2 |
| Cat. X, [CMDS] | 0.09 | 2.2 |
| | 0.18 | 5.6 |
| | 0.27 | 7.2 |
| | 0.45 | 24.0 |
| Cat. X, [CPDS] | 0.09 | 0.7 |
| | 0.27 | 2.8 |
| | 0.36 | 3.7 |
| | 0.45 | 4.7 |
| Cat. X, [DIDS] | 0.09 | 1.1 |
| | 0.27 | 2.7 |
| | 0.45 | 8.4 |

TABLE 3

| Catalyst Sample (Al/Si - 10) | Hydrogen, mol % | Melt Flow, g/10 min |
|---|---|---|
| RK-100, [CMDS] | 0.09 | 3.7 |
| | 0.27 | 19.0 |
| | 0.45 | 32.0 |
| RK-100, [DIDS] | 0.09 | 5.0 |
| | 0.27 | 19.6 |
| | 0.45 | 50.0 |
| RK-100, [CPDS] | 0.09 | 3.2 |
| | 0.27 | 14.0 |
| | 0.45 | 28.0 |
| RH-220, [CMDS] | 0.09 | 4.1 |
| | 0.45 | 13.3 |
| Cat. X, [CMDS] | 0.09 | 1.6 |
| | 0.27 | 2.9 |
| | 0.45 | 10.6 |
| Cat. X, [CPDS] | 0.09 | 0.7 |
| | 0.18 | 1.0 |
| | 0.27 | 2.2 |
| Cat. X, [DIDS] | 0.09 | 0.7 |
| | 0.27 | 3.2 |
| | 0.45 | 5.2 |

While laboratory results are extremely consistent in establishing polymer melt flow trends, experience suggests that MFR in actual production will usually be significantly higher under certain conditions (i.e., high hydrogen concentration and low external donor levels) than what is seen in the laboratory. This is confirmed in actual production trials, which are discussed below. It is evident from laboratory results that the diether internal donor-containing catalyst yields significantly higher melt flows under all conditions (i.e., donor, hydrogen level, donor choice) than does the comparative catalyst. At the highest hydrogen concentration (0.45 mol %), the melt flows of samples produced with RK-100 and RH-220 ranged from about 15 to 50 g/10 min, while those produced with the standard Catalyst X gave melt flows in the 5–10 g/10 min range. Similar results were obtained at Al/Si –50 (FIG. 1). The diether internal donor-containing catalyst RK-100 and RH-220 gave polymers with melt flows in the 30–55 g/10 min range at the highest hydrogen concentration, while those produced with Catalyst X were in the 5–20 g/10 min range. From these results, it is evident that the diether internal donor-containing catalysts possess a relatively high hydrogen response. As noted previously, the diether internal donor-containing catalyst activities are also significantly increased at higher hydrogen concentrations.

EXAMPLE 3

Xylene Solubles

Figure 3:
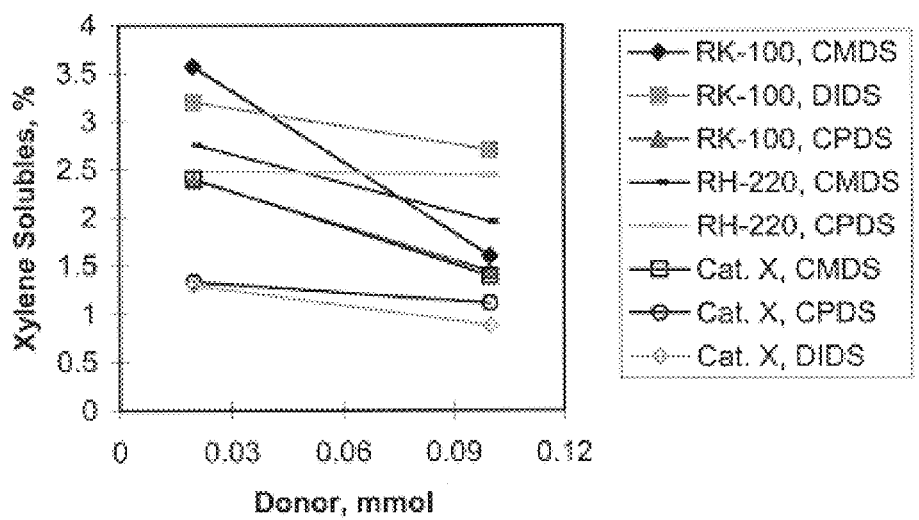
FIG. 3 is a plot of xylene solubles versus donor level at low hydrogen concentrations for given catalysts and donors.
Figure 4:
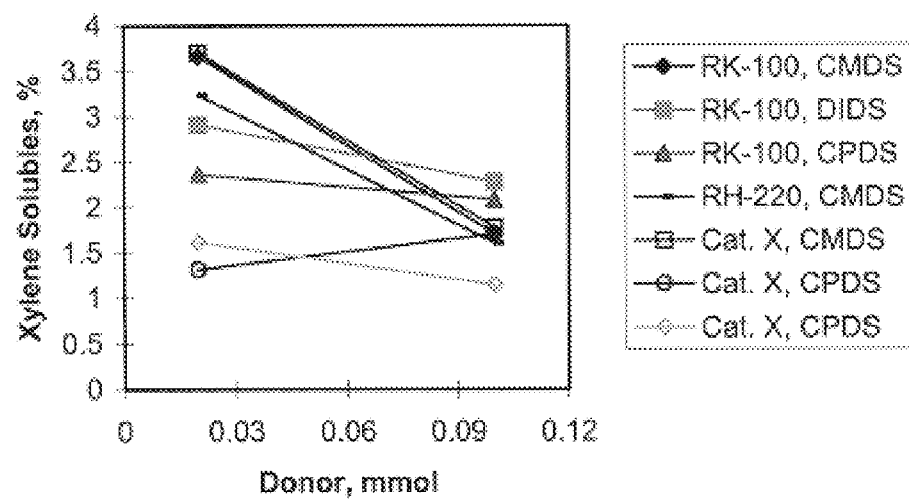
FIG. 4 is a plot of xylene solubles versus donor levels at higher hydrogen concentrations for given catalysts and donors.

The xylene solubles levels as a function of donor concentration at low (0.09 mol %—FIG. 3) and high (0.45 mol %—FIG. 4) hydrogen levels are shown in FIGS. 3–4 and presented in tabulated form in Tables 4 and 5, respectively, below.

TABLE 4

| Catalyst Sample | Donor, mmol | Xylene Solubles, wt % |
|---|---|---|
| RK-100, CMDS | 0.02 | 3.6 |
| | 0.1 | 1.6 |
| RK-100, DIDS | 0.02 | 3.2 |
| | 0.1 | 2.7 |
| RK-100, CPDS | 0.02 | 2.4 |
| | 0.1 | 1.4 |
| RH-220, CMDS | 0.02 | 2.8 |
| | 0.1 | 2.0 |
| RH-220, CPDS | 0.02 | 2.5 |
| | 0.1 | 2.4 |

TABLE 4-continued

| Catalyst Sample | Donor, mmol | Xylene Solubles, wt % |
|---|---|---|
| Cat. X, CMDS | 0.02 | 2.4 |
| | 0.1 | 1.4 |
| Cat. X, CPDS | 0.02 | 1.3 |
| | 0.1 | 1.1 |
| Cat. X, DIDS | 0.02 | 1.3 |
| | 0.1 | 0.9 |

TABLE 5

| Catalyst Sample | Donor, mmol | Xylene Solubles, wt % |
|---|---|---|
| RK-100, CMDS | 0.02 | 3.7 |
| | 0.1 | 1.7 |
| RK-100, DIDS | 0.02 | 2.9 |
| | 0.1 | 2.3 |
| RK-100, CPDS | 0.02 | 2.4 |
| | 0.1 | 2.1 |
| RH-220, CMDS | 0.02 | 3.2 |
| | 0.1 | 1.6 |
| Cat. X, CMDS | 0.02 | 3.7 |
| | 0.1 | 1.8 |
| Cat. X, CPDS | 0.02 | 1.3 |
| | 0.1 | 1.7 |
| Cat. X, DIDS | 0.02 | 1.6 |
| | 0.1 | 1.1 |

As seen from FIGS. 3–4, the xylene solubles levels decrease with increasing donor level. At low donor concentration (Al/Si –50), RK-100 and RH-220 catalysts gave polypropylene resins with xylene solubles levels in the 2.5–3.5% range. The standard Catalyst X also gave xylene solubles of about 1.5% -3.5%. It should be noted that polymerization runs were also made with RK-100 and RH-220 catalysts in the absence of external donor. Without the external donors, the xylene solubles levels remained relatively low (~4%). For comparison, the standard Catalyst X (not shown) yielded >20% xylene solubles in the absence of an external donor. From these results, it is evident that a conventional phthalate-containing Ziegler-Natta catalyst could not be used commercially in the presence of very low (or no) external donor to obtain ultra high melt flow resins due to the likelihood of catastrophically high xylene solubles formation.

EXAMPLE 4
Fluff Particle Size Distribution

Figure 5:
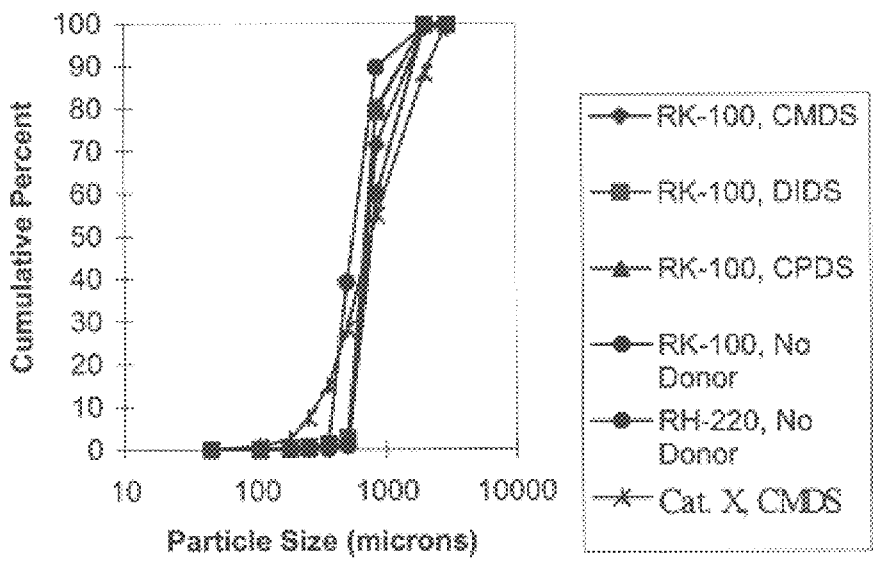
FIG. 5 is a plot of fluff particle size distribution of polymers produced utilizing different catalysts and donors.

The particle size distributions (PSD) of selected fluff samples produced with Mitsui RK-100, Mitsui RH-220 and Catalyst X catalysts were obtained by sieve 20 analyses. The results for polymers prepared with various donors (Al/Si –50) at a hydrogen level of 0.27 mol % are shown in FIG. 5.

As seen from the results, the fluff particle size distributions from RK- 100 and RH-220 were more narrow than that for Catalyst X, although the D50 values were similar. Also, the fluff particle size distributions from RK-100 and RH-220 were similar for the various donors, as well as for the polymer prepared in the absence of donor. The bulk densities of the fluff samples produced with RK-100 and RH-220 (~0.44 g/cc) were similar to those prepared from the conventional Ziegler-Natta catalyst, Catalyst X (~0.48 g/cc). From optical microscopy (20×), it was observed that the polymer fluff morphology from RK-100 and RH-220 are "cluster" or "aggregate" in nature, as opposed to that from Catalyst X which was irregular and granular in appearance.

EXAMPLE 5
Thermal and Molecular Weight Properties

The thermal properties, as measured by differential scanning calorimetry (DSC), and molecular weight properties, as measured through gel permeation chromatography (GPC), of representative polymers prepared from RK-100, RH-220 and Catalyst X catalysts in the presence of various donors are given in Tables 6–7. The selected samples were prepared at Al/Si –50 and 0.27 mol % hydrogen.

TABLE 6

Thermal Properties of Polymers Prepared with Mitsui RK-100 and Catalyst X Catalysts Using Various Donors
[Al/Si - 50, 0.27 mol % Hydrogen]

| Run # | Catalyst | Donor | Melt Flow | Xylene Sol., % | $T_m$, °C. | $\Delta H_m$, J/g | $T_r$, °C. | $\Delta H_r$, J/g |
|---|---|---|---|---|---|---|---|---|
| 1 | RK-100 | CMDS | 16.4 | 3.5 | 156.2/162.9 | 93.6 | 107.9 | −96.1 |
| 2 | RK-100 | DIDS | 22.0 | 2.5 | 157.1/163.5 | 88.2 | 109.1 | −96.8 |
| 3 | RK-100 | CPDS | 14.0 | 2.7 | 158.1/164.5 | 107.9 | 108.2 | −98.6 |
| 4 | RK-100 | None | 20 | 6.0 | 156.9/163.5 | 83.2 | 107.4 | −94.2 |
| 5 | RH-220 | CMDS | 4.1 | 2.0 | 161/164 | 94.3 | 109.6 | −94.2 |
| 6 | RH-220 | CPDS | 3.7 | 2.4 | 158/164 | 95.4 | 108.0 | −94.9 |
| 7 | RH-220 | None | 51.8 | 3.5 | 156/163 | 98.5 | 106.6 | −93.6 |
| 8 | Cat. X | CMDS | 10.2 | 5.7 | 160.4 | 94.1 | 108.1 | −85.6 |
| 9 | Cat. X | DIDS | 2.7 | 1.5 | 159.4/165.1 | 106.1 | 110.1 | −100.1 |
| 10 | Cat. X | CPDS | 3.7 | 1.3 | 161.2/166.1 | 104.2 | 109.8 | −98.9 |

From the DSC results, it was observed that the polymers prepared with the diether internal donor-containing catalyst in the presence of various donors (or no donor) exhibited similar melting points, recrystallization temperatures (107–109° C.), and heats of recrystallization ($\Delta H_r$). The heat of fusion values showed some variation, with CPDS yielding the highest $\Delta H_m$ (107.9 J/g) and no donor the lowest (83.2 J/g).

TABLE 7

Molecular Weight Results for Polymers Prepared with Mitsui RK-100 and Catalyst X Catalysts Using Various Donors
[Al/Si - 50, 0.27 mol % Hydrogen]

| Run # | Catalyst | Donor | Mn/1000 | Mw/1000 | Mz/1000 | D (Mw/Mn) |
|---|---|---|---|---|---|---|
| 1 | RK-100 | CMDS | 32.8 | 236.7 | 933.9 | 7.2 |
| 2 | RK-100 | DIDS | 36.4 | 228.5 | 847.0 | 6.3 |
| 3 | RK-100 | CPDS | 40.6 | 258.4 | 994.5 | 6.4 |
| 4 | RK-100 | None | 38.4 | 225.5 | 780.2 | 5.9 |
| 5 | RH-220 | CMDS | 50.5 | 320.0 | 846.0 | 6.3 |
| 6 | RH-220 | CPDS | 60.7 | 344.0 | 951.0 | 5.7 |
| 7 | RH-220 | None | 23.8 | 139.0 | 405.0 | 5.8 |
| 8 | Cat. X | CMDS | 42.3 | 271.0 | 882.9 | 6.4 |
| 9 | Cat. X | DIDS | 44.7 | 458.6 | 1648 | 10.3 |
| 10 | Cat. X | CPDS | 39.3 | 380.6 | 1308 | 9.7 |

The GPC results showed the expected trends in that lower molecular weights (particularly Mw) gave higher polymer melt flows. It is noted that relatively narrow molecular weight distributions were obtained with the diether internal donor-containing catalysts RK-100 and RH-220 compared to the previously prepared polymers utilizing the comparative Catalyst X.

EXAMPLE 6

Plant trials were conducted in a single loop bulk polymerization reactor with the internal-diether-containing Ziegler-Natta catalyst Mitsui RK-100 with a CMDS external donor for propylene polymerization. The RK-100 catalyst used for the trial contained 2.3 wt. % titanium and 17.3 wt. % magnesium. Typical propylene feed rates were on the order of 10,000 lbs./hr. The start-up production conditions were as follows:

Hydrogen Concentration: 0.980 mol %
Donor Level—2.4 ppm
Cocatalyst Level (TEAL) 135 ppm
Reactor Temperature: 145° F. (62.8° C.)
Percent solids: 33–38% range.

During polymerization, the hydrogen levels were adjusted to obtain MF's in the 300–400 range and were finally settled at 0.540 mol %. During the trials, the CMDS donor level was reduced several times to determine the donor response of the catalyst. The cocatalyst level was not changed. Specifically, the donor level was reduced as follows:

Donor from 2.4 ppm to 2 ppm—little, if any, effect on xylene solubles.
Donor from 2 ppm to 1.6 ppm—xylene solubles remained in the 2.1–2.6% range.
Donor from 1.6 ppm to 1.2 ppm—xylene solubles remained in the 2.1–2.6% range.
Donor from 1.2 ppm to 1 ppm—xylene solubles remained in the 2.1–2.6% range.
Donor from 1 ppm to 0.6 ppm—xylene solubles remained in the 2.5–2.9% range.

After the external donor had been lowered to 0.6 ppm, analysis of fluff samples for % Mg showed increased productivity of about 30%, thus further enhancing the benefits of the catalyst at low donor levels.

Figure 6:
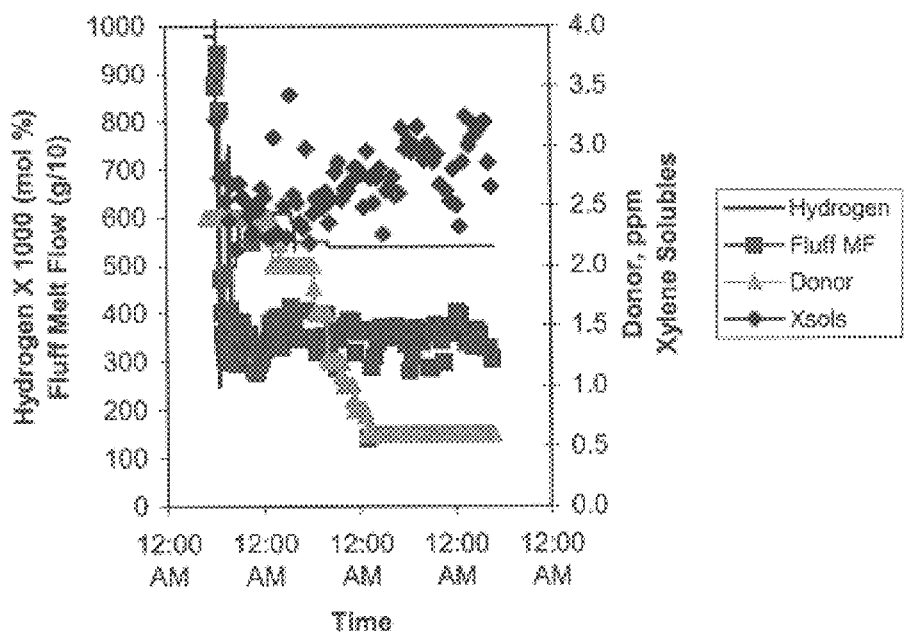
FIG. 6 is a plot of hydrogen concentration, melt flow, donor levels and xylene solubles for a given diether internal donor-containing catalyst.

The key trends of hydrogen level (mol % ×1000) and donor level and the corresponding fluff melt flows and xylene solubles are summarized in Table 8, below, and in FIG. 6.

TABLE 8

RK-100 Catalyst

| | |
|---|---|
| Hydrogen Level | 0.540–0.980 mol % |
| Fluff Melt Flow Range | 280 to 943 g/10 min |
| Donor Range | 0.6 to 2.4 ppm |
| Xylene Solubles | 2.1 to 3.2 wt. % |

The plot depicts the hydrogen levels necessary to obtain melt flows in the desired range and the flat xylene solubles response to donor changes. As evidenced in the plot, when stable production was achieved ("lined out") the hydrogen concentration of 0.540 mol % gave corresponding average fluff MF of 350 g/10 min, and the donor level of 0.6 ppm gave average xylene solubles of ~2.8%, clearly showing the ability of the diether-containing Mitsui RK-100 catalyst to yield the desirable balance of very high resin melt flow with relatively low xylene solubles levels.

Figure 7:
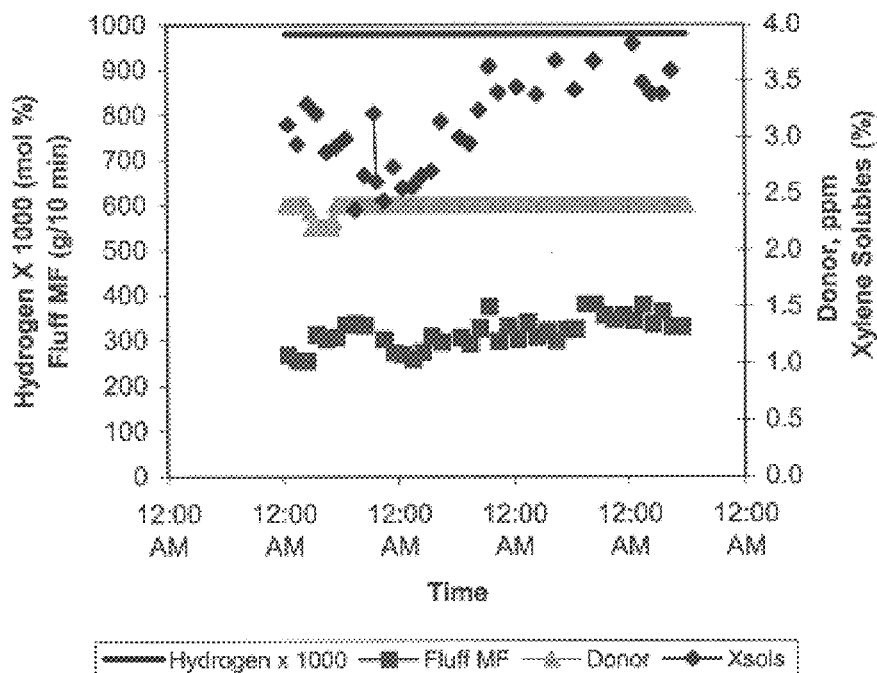
FIG. 7 is a plot of hydrogen concentration, melt flow, donor levels and xylene solubles for a conventional Ziegler-Natta catalyst.

For comparison, a similar plot of hydrogen, fluff MF, donor level and xylene solubles during typical UHMF production with a conventional internal-phthalate-containing Ziegler-Natta catalyst designated "Y", is shown in FIG. 7 and in Table 9 below.

TABLE 9

Catalyst Y

| | |
|---|---|
| Hydrogen Level | 0.980 mol % |
| Fluff Melt Flow Range | 255–380 g/10 min |
| Donor Range | 2.2–2.4 ppm |
| Xylene Solubles | 2.4 to 3.8 wt. % |

From the plot, the conventional Ziegler-Natta catalyst required about twice as much hydrogen (0.980 mol %) to give average fluff melt flow rates ~315 g/10 min with xylene solubles averaging ~3.1% (and often approaching an undesirable level of >3.5% xylene solubles) at a constant donor level of 2.4 ppm.

Production Summary

The resulting fluff, pellet and xylene solubles results for each product made are listed in Table 10 below. Products designated with "Y" are used to designate products made with the conventional Ziegler-Natta catalyst, and are listed for comparison. Average values are listed in Table 10, with ranges in parentheses.

TABLE 10

Summary of Polymer Properties

| | Fluff MF (g/10 min) | Pellet MF (g/10 min) | Xsols (%) |
|---|---|---|---|
| 1 | 376 (324–550) | 756 (629–881) | 2.5 (2.1–3.1) |
| 2 | 363 (320–414) | 393 (342–447) | 2.5 (2.2–3.4) |
| 3 | 342 (287–367) | 360 (304–395) | 2.7 (2.5–2.9) |
| 4 | 341 (142–402) | 364 (284–405) | 2.8 (2.3–3.2) |
| 5 | 363 (353–373) | 1385 (1329–1551) | 2.8 (2.6–3.1) |
| 2Y | 280 (239–369) | 325 (272–440) | 2.2 (1.7–2.7) |
| 3Y | 287 (147–427) | 331 (250–428) | 3.0 (2.0–4.0) |
| 4Y | 324 (243–389) | 336 (282–415) | 3.2 (2.4–4.1) |
| 5Y | 314 (275–381) | 1426 (1197–1870) | 2.6 (1.9–3.1) |

As evidenced from the results above, the diether internal donor-containing RK-100 catalyst gave desirable fluff melt flow rates (~350 g/10 min), while xylene solubles were <3%.

Catalyst Productivity

During testing, the diether internal donor-containing catalyst RK-100 productivity was ~14% higher compared with typical UHMF production produced using conventional Ziegler-Natta catalysts.

Figure 8:
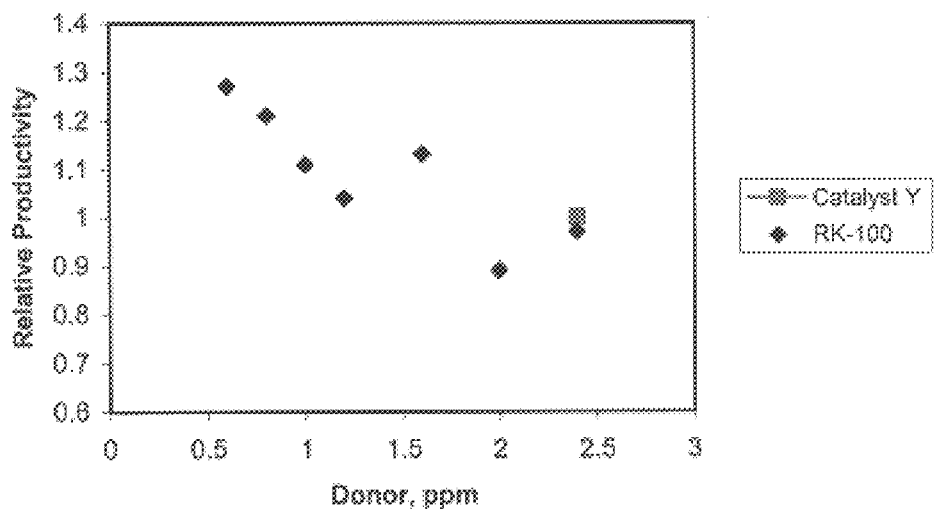
FIG. 8 is a plot of catalyst productivity versus donor level trend for polymer fluff produced from a given diether internal donor-containing catalyst.

Throughout the trial, fluff samples were collected at each external donor level and analyzed for magnesium content to estimate catalyst productivity. Average productivities (based on % Mg) were calculated at each donor level. The trend of relative catalyst productivity vs. donor level is plotted in FIG. 8 and the results are listed in Table 11. As the donor level was decreased from its highest level of 2.4 ppm to its lowest level of 0.6 ppm, catalyst productivity was found to increase by about 30%, as measured by % Mg.

TABLE 11

Productivities for RK-100 and "Y" Catalyst

| Catalyst | Donor, ppm | Relative Productivity |
|---|---|---|
| RK-100 | 0.6 | 1.3 |
| | 0.8 | 1.2 |
| | 1.0 | 1.1 |
| | 1.2 | 1.0 |
| | 1.6 | 1.1 |

TABLE 11-continued

Productivities for RK-100 and "Y" Catalyst

| Catalyst | Donor, ppm | Relative Productivity |
|---|---|---|
| | 2.0 | 0.9 |
| | 2.4 | 1.0 |
| Catalyst Y | 2.4 | 1.0 |

Xylene Solubles Control

In laboratory trials, the diether internal donor-containing catalyst RK-100 was found to give xylene solubles between 3.5–4.5% in the absence of any added external donor. In contrast, existing catalyst systems with phthalate internal donors gave xylene solubles >20% in the absence of any added external donor, resulting in a "sticky" fluff. Over the entire plant trial lasting two weeks, the xylene solubles for RK-100 averaged 2.7% (range ~2.1–3.4, of 90 samples analyzed). In comparison, a typical "Y" catalyst resulted in xylene solubles averaging ~3.2% (range 2.4–4.1%, of 39 samples analyzed). For each donor level, the xylene solubles were averaged together and then plotted vs. donor level as shown in FIG. 9, with the results being listed in Table 12 below.

TABLE 12

| Catalyst | Donor, ppm | Average Xylene Solubles (wt %) |
|---|---|---|
| RK-100 | 0.6 | 2.8 |
| | 0.8 | 2.7 |
| | 1.0 | 2.6 |
| | 1.2 | 2.6 |
| | 1.6 | 2.6 |
| | 2.0 | 2.6 |
| | 2.4 | 2.5 |
| Catalyst Y | 2.4 | 3.2 |

Figure 9:
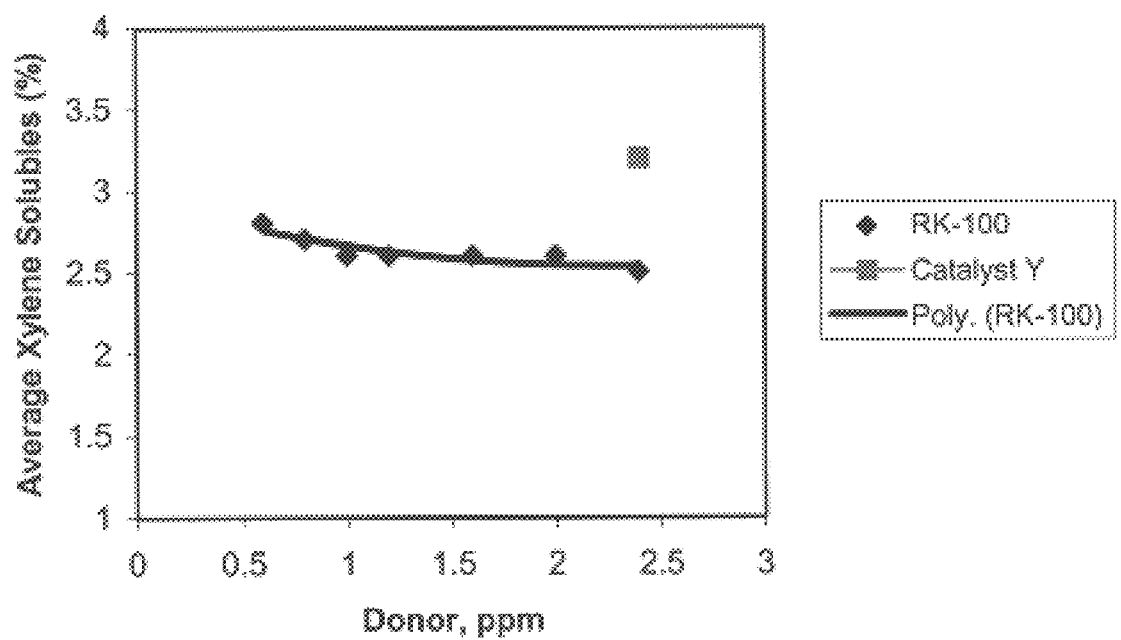
FIG. 9 is a plot of xylene solubles versus donor level for a given diether internal donor-containing catalyst.

As can be seen from the plot in FIG. 9, the xylene solubles response of RK-100 was relatively flat with decreasing donor level. The average xylene solubles stayed within 2.5–3.0% as donor level was dropped from 2.4 ppm to 0.6 ppm. Based on a curve fit analysis represented of the plotted data represented by the following formula:

$$y = 13.961x^2 - 5.546x + 3.0923 \quad (4)$$

where "y" is the average xylene solubles by weight of polymer, and "x" is the donor level in ppm by weight of monomer. From the equation, the xylene solubles are predicted to be ~3.1% at zero external donor level.

Fluff Characterization

During trials, spot fluff samples of each product type were tested for thermal and molecular weight properties. The findings are listed in Table 13 below, along with a typical "Y" catalyst fluff sample.

TABLE 13

Thermal, Molecular Weight Properties of Fluff from RK catalyst

| Product | 1 | 2 | 3 | 4 | 5 | 4Y |
|---|---|---|---|---|---|---|
| Fluff MF (g/10 min) | 393 | 347 | 347 | 329 | 365 | 302 |
| Xsols (%) | 2.3 | 2.5 | 2.9 | 3.2 | 2.6 | 3.4 |
| $T_r$ (° C.) | 108 | 108 | 111 | 111 | 109 | 106, 111 |

TABLE 13-continued

Thermal, Molecular Weight Properties of Fluff from RK catalyst

| Product | 1 | 2 | 3 | 4 | 5 | 4Y |
|---|---|---|---|---|---|---|
| $\Delta H_r$ (J/g) | −98.4 | −97.8 | −99.0 | −97.7 | −97.3 | −101.3 |
| $T_m$ (° C.) | 157, 163 | 157, 163 | 159, 164 | 159, 164 | 156, 161 | 159, 165 |
| $\Delta H_m$ (J/g) | 98.7 | 102.9 | 103.0 | 100.3 | 98.4 | 103.7 |
| Mn/1000 | 13.4 | 13.9 | 13.9 | 14.2 | 13.5 | 12.7 |
| Mw/1000 | 73.9 | 80.4 | 80.4 | 80.0 | 77.2 | 89.0 |
| Mz/1000 | 221.7 | 258.9 | 260.8 | 252.4 | 246.7 | 326.6 |
| D (Mw/Mn) | 5.5 | 5.8 | 5.8 | 5.6 | 5.7 | 7.0 |
| D' (Mz/Mw) | 3.0 | 3.2 | 3.2 | 3.2 | 3.2 | 3.7 |

From the above results, it is evident that fluff from the diether internal donor-containing catalyst resulted in lower xylene solubles at similar melt flows compared to "Y" catalyst. Also, the thermal properties of the resulting fluff from the diether internal donor-containing catalyst fell within expected values for homopolymer polypropylene and compared favorably with the thermal properties of fluff from "Y" catalyst ($T_m$~165° C., $\Delta H_m$~100 J/g, $T_r$~110° C., $\Delta H_r$~−100 J/g). It should be noted that the differential scanning calorimetry (DSC) traces of reactor fluff (which has not been melted, extruded and pelletized) commonly contained shoulders giving rise to the listing of two melting peaks, whereas pellet samples generally showed only one melting peak. From the molecular weight data, it was seen that diether internal donor-containing catalyst produced fluff with a narrower molecular weight distribution (D~5.5–5.8, D'~3.0–3.2) compared to "Y" catalyst (D~7.0, D'~3.7).

Spot fluff and pellet samples of Product 1, which is processed using controlled rheology techniques from a MF of ~350 up to ~750 g/10 min, were collected to verify peroxide addition and expected narrowing of the molecular weight distribution. In addition, fluff and pellet samples of Product 4, which was not subjected to controlled rheology, were collected to ensure that unexpected vis-breaking did not occur in extrusion. The molecular weight properties of the fluff and pellet samples were determined and the results are listed below in Table 14.

TABLE 14*

Comparison of Fluff and Pellet Thermal and Molecular Weight Properties

| Product | 1 | 1 | 4 | 4 |
|---|---|---|---|---|
| Sample | Fluff | Pellet | Fluff | Pellet |
| MF (g/10 min) | 296 | 692 | 392 | 383 |
| Xsols (%) | — | — | 2.7 | 2.7 |
| $T_r$ (° C.) | — | — | 111 | 116 |
| $\Delta H_r$ (J/g) | — | — | −99.8 | −99.3 |
| $T_m$ (° C.) | — | — | 159, 165 | 160 |
| $\Delta H_m$ (J/g) | — | — | 103.7 | 97.9 |
| Mn/1000 | 14.3 | 14.7 | 13.7 | 13.7 |
| Mw/1000 | 85.0 | 78.7 | 78.2 | 80.9 |
| Mz/1000 | 273.5 | 239.7 | 252.4 | 264.9 |
| D (Mw/Mn) | 5.9 | 5.4 | 5.7 | 5.9 |
| D' (Mz/Mw) | 3.2 | 3.0 | 3.2 | 3.3 |

* Dashed lines indicate no data measured for sample.

In comparing the fluff and pellet molecular weight data for Product 1, the molecular weight distribution further narrowed (D~5.4, D'3.0) upon addition of peroxide. For Product 4, the molecular weight properties and distributions of the fluff and pellet samples were similar in the absence of any added peroxide, thus verifying that unexpected chain degradation did not occur in the extruder. In addition, the thermal properties of Product 4 fluff and pellets were similar, and the pellet samples showed only one melting peak ($T_m$=160° C.), as discussed above. All of these results confirm that the ultra high melt flow resins produced with the diether-containing Mitsui RK-100 catalyst possess expected and desired thermal and molecular weight properties.

The ultra high melt flow polypropylene resins of the invention have particular application in forming melt blown fibers, where a high melt flow is necessary. These fibers can be used in forming textile materials, particularly nonwoven textiles. Such nonwoven textiles formed from melt blown fibers are often used in surgical coverings, such as drapes, gowns and masks. Textiles formed from such fibers can also be used in absorbent articles, such as diapers and feminine hygiene products. Additionally, the ultra high melt flow polypropylene resins of the invention can be used in glass composites as a binder material and in film coatings, wherein the resin is applied to the surface of films or other substrates. The polypropylene may also be used in certain injection molding applications when compounded with fillers (e.g. talc, calcium carbonate, glass, etc.) or other resins, such as EPR rubber, to manufacture automotive-related articles (e.g. bumper fascia, external or interior trim, body panels, and the like), appliance parts (e.g. external and internal appliance components and trim) and thin-walled packaging, such as containers, cups, etc.). Because the resin materials of the invention have low xylene solubles they may be particularly suited for use in medical or food handling applications, such drapes, gowns, masks, gloves, food packaging, plates, cups, bowls, food containers, etc.

Ultra high melt flow polymer resins can be prepared during polymerization without the need for further processing, such as through controlled rheology techniques. This may reduce manufacturing costs and process steps that would otherwise be needed. Also taste and odor issues which result from peroxide residues from the addition and decomposition of peroxides added during controlled rheology are avoided. The amount of external donor compounds can be reduced, if not eliminated, while still obtaining polymers with low xylene solubles. This can result in an increased catalyst activity. Because the diether internal donor-containing catalyst exhibits a higher sensitivity to hydrogen, the polymerization can be carried out with reduced hydrogen concentration. This is advantageous where high hydrogen concentrations are not practical, but where high melt flow is desirable.

While the invention has been shown in only some of its forms, it should be apparent to those skilled in the art that it is not so limited, but is susceptible to various changes and modifications without departing from the scope of the invention. Accordingly, it is appropriate that the appended claims be construed broadly and in a manner consistent with the scope of the invention.

We claim:

1. A method of preparing polypropylene comprising polymerizing propylene monomer within a reaction zone in the presence of a di- or polyether internal donor-containing Ziegler-Natta catalyst system and hydrogen from about 0.3 to about 1.1 mol % of monomer feed, to yield a propylene polymer having a melt flow of at least about 300 g/10 min and a xylene solubles of not more than about 3.5% by weight.

2. The method of claim 1, wherein the propylene polymer has a xylene solubles of from about 1% to 3.5% by weight.

3. The method of claim 1, wherein the reaction zone is a bulk phase polymerization reaction zone.

4. The method of claim 1, wherein the reaction zone is a gas phase polymerization reaction zone.

5. The method of claim 1, wherein the reaction zone is a slurry polymerization reaction zone.

6. The method of claim 1, wherein the catalyst system also contains an external donor present in an amount of from 0.01 to about 10 ppm by weight of monomer.

7. The method of claim 6, wherein the external donor is present in an amount of from 0.01 to about 1 ppm by weight of monomer.

8. The method of claim 6, wherein the external donor is present in an amount of from 0.01 to about 0.5 ppm by weight of monomer.

9. The method of claim 1, wherein the Ziegler-Natta catalyst system further includes an internal phthalate donor.

* * * * *